US009953532B2

(12) United States Patent
Tanaka et al.

(10) Patent No.: US 9,953,532 B2
(45) Date of Patent: Apr. 24, 2018

(54) OBSTACLE WARNING APPARATUS (71) Applicants: DENSO CORPORATION, Kariya, Aichi-pref. (JP); TOYOTA JIDOSHA KABUSHIKI KAISHA, Toyota-shi, Aichi-ken (JP)

(72) Inventors: Hidenori Tanaka, Kariya (JP); Akihiro Kida, Toyota (JP)

(73) Assignees: DENSO CORPORATION, Kariya, Aichi-pref. (JP); TOYOTA JIDOSHA KABUSHIKI KAISHA, Toyota-shi, Aichi-ken. (JP)

( * ) Notice: Subject to any disclaimer, the term of this patent is extended or adjusted under 35 U.S.C. 154(b) by 0 days.

(21) Appl. No.: 15/520,046

(22) PCT Filed: Oct. 21, 2015

(86) PCT No.: PCT/JP2015/005306
§ 371 (c)(1),
(2) Date: Apr. 18, 2017

(87) PCT Pub. No.: WO2016/063535
PCT Pub. Date: Apr. 28, 2016

(65) Prior Publication Data
US 2017/0352270 A1  Dec. 7, 2017

(30) Foreign Application Priority Data
Oct. 22, 2014  (JP) ................. 2014-215717

(51) Int. Cl.
G08B 21/00  (2006.01)
G08G 1/16  (2006.01)
G01S 15/93  (2006.01)

(52) U.S. Cl.
CPC .............. *G08G 1/16* (2013.01); *G01S 15/931* (2013.01); *G01S 2015/938* (2013.01)

(58) Field of Classification Search
CPC ........................................... G08G 1/18
USPC ................... 340/435, 436; 701/301
See application file for complete search history.

(56) References Cited

U.S. PATENT DOCUMENTS

2016/0116584 A1* 4/2016 Fukuman .............. G01S 15/931
367/93

FOREIGN PATENT DOCUMENTS

| JP | 2003-114276 A | 4/2003 |
|---|---|---|
| JP | 2007-245814 A | 9/2007 |
| JP | 2009-234296 A | 10/2009 |
| JP | 4971227 B2 | 7/2012 |
| JP | 2013-020458 A | 1/2013 |
| WO | 2016/063532 A1 | 4/2016 |
| WO | 2016/063534 A1 | 4/2016 |

* cited by examiner

*Primary Examiner* — Jeffery Hofsass
(74) *Attorney, Agent, or Firm* — Knobbe, Martens, Olson & Bear, LLP (57) ABSTRACT

An obstacle warning apparatus in a vehicle specifies a position of an obstacle relative to the vehicle based on a detection result by an obstacle sensor. A warning determination section determines whether a warning about the obstacle needs to be executed, based on the specified position of the obstacle. The warning determination section determines that the warning about the obstacle does not need to be executed when an overlap determination section determines that a vehicle range overlaps with a range where the obstacle exists.

6 Claims, 4 Drawing Sheets

FIG. 6

OBSTACLE WARNING APPARATUS

CROSS REFERENCE TO RELATED APPLICATION

The present application is based on Japanese Patent Application No. 2014-215717 filed on Oct. 22, 2014, the disclosure of which is incorporated herein by reference.

TECHNICAL FIELD

The present disclosure relates to an obstacle warning apparatus that provides, to a driver of a vehicle, a warning about an obstacle existing around the vehicle.

BACKGROUND ART

There is conventionally known an obstacle warning apparatus, which detects an obstacle existing around a vehicle and issues a warning that notifies a driver of an existence of the obstacle. For example, Patent literature 1 discloses an obstacle warning apparatus, which detects an obstacle with an obstacle sensor, records a relative position of the obstacle relative to a vehicle, and calculates a movement amount and a movement direction to update the recorded relative position of the obstacle when a position of the vehicle changes. A warning is issued when the distance between the vehicle and the relative position of the obstacle is equal to or less than a predetermined distance.

In addition, Patent literature 2 discloses an obstacle warning apparatus that issues a warning when there is a possibility that an obstacle detected by an obstacle sensor may be involved due to a turning radius difference between tracks followed by front and rear inner wheels when turning.

PRIOR ART LITERATURES

Patent Literature

Patent literature 1: JP 2003-114276 A
Patent literature 2: JP 4971227 B2

SUMMARY OF INVENTION

The obstacle warning apparatuses in Patent literature 1 and Patent literature 2 each issue a warning based on a relative position of an obstacle detected by an obstacle sensor, relative to the vehicle. Such an obstacle sensor may provide an incorrect detection due to noises or reflection from road surfaces; the incorrect detection indicates that an obstacle is existing in a position where the obstacle does not exist actually. In addition, when an obstacle is a moving object, a movement of the obstacle may cause the obstacle to disappear from a position where the obstacle is detected.

If several search waves are enabled to be transmitted to an identical spot with time intervals, the latest detection result may correct the past detection result. However, a vehicle running may not allow several search waves to be transmitted to an identical spot with time intervals. Suppose a configuration of an obstacle sensor transmitting search waves towards a lateral region relative to the vehicle. In such a configuration, the vehicle, which moves in the direction orthogonal to the transmission direction of the search waves, provides a difficulty in transmitting several search waves to an identical spot with time intervals.

Thus the obstacle warning apparatus fails to recognize that an obstacle does not actually exist in the recorded detection position, issuing an unnecessary warning about the obstacle which does not exist in fact. In addition, such a warning is continued while the distance between the vehicle and the recorded obstacle is within a predetermined distance, possibly making the driver feel much more troublesome.

It is an object of the present disclosure to provide an obstacle warning apparatus which reduces a period of time during which unnecessary warning is continued.

According to an example of the present disclosure, an obstacle warning apparatus that is used in a vehicle and cooperates with an obstacle sensor detecting an obstacle around the vehicle is provided as including an obstacle position specification section, a warning determination section, a warning processing section, and an overlap determination section. The obstacle position specification section specifies a position of an obstacle with respect to the vehicle based on a detection result by the obstacle sensor. The warning determination section determines whether a warning that reports an existence of the obstacle needs to be executed, based on the position of the obstacle specified by the obstacle position specification section. The warning processing section causes the warning to be executed to a driver when the warning determination section determines that the warning needs to be executed. The overlap determination section determines whether a vehicle range where the vehicle exists overlaps with a range where the obstacle exists, based on the position of the obstacle specified by the obstacle position specification section. Further, the warning determination section determines that the warning about the obstacle does not need to be executed when the overlap determination section determines that the vehicle range overlaps with the range where the obstacle exists.

Under the above configuration, the warning determination section determines the necessity of a warning based on the position of the obstacle specified by the obstacle position specification section, while the warning processing executes the warning when the warning determination section determines that the warning is necessary.

The warning determination section determines the necessity of a warning based on the position of the obstacle specified by the obstacle position specification section. Even if the obstacle does not actually exist in the range where the obstacle is assumed to exist, the warning about the obstacle not existing actually may be started. The warning about the obstacle which does not exist actually signifies a warning unnecessary for the driver.

Now, if an obstacle detected by the obstacle sensor is a stationary object which actually exists, the vehicle cannot be located in a range in which the detected obstacle exists. However, when an obstacle which does not exist actually is mistakenly detected due to noises etc., the vehicle can be located in a range in which the obstacle is assumed to exist. In other words, a fact that the vehicle is able to be located in a range in which the obstacle is assumed to exist by the obstacle position specification section signifies that the obstacle does not exist in the range actually.

Suppose states that the warning determination section determines that the warning about an obstacle needs to be executed while the overlap determination section determines that the range where the vehicle exists overlaps with the range where the obstacle exists. Such states signify that the unnecessary warning is executed.

Under the above configuration, the warning determination section determines that a warning does not need to be executed when the overlap determination section determines that the range where the obstacle exists overlaps with the range where the vehicle exists. Therefore, under the above configuration, even if the warning about an obstacle which does not exist actually is being executed, the warning determination section determines that the warning is unnecessary at the time when the overlap determination section determines that the vehicle overlaps with the obstacle, stopping the warning. This can reduce a period of time during which the unnecessary warning is continued.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

Figure 1:
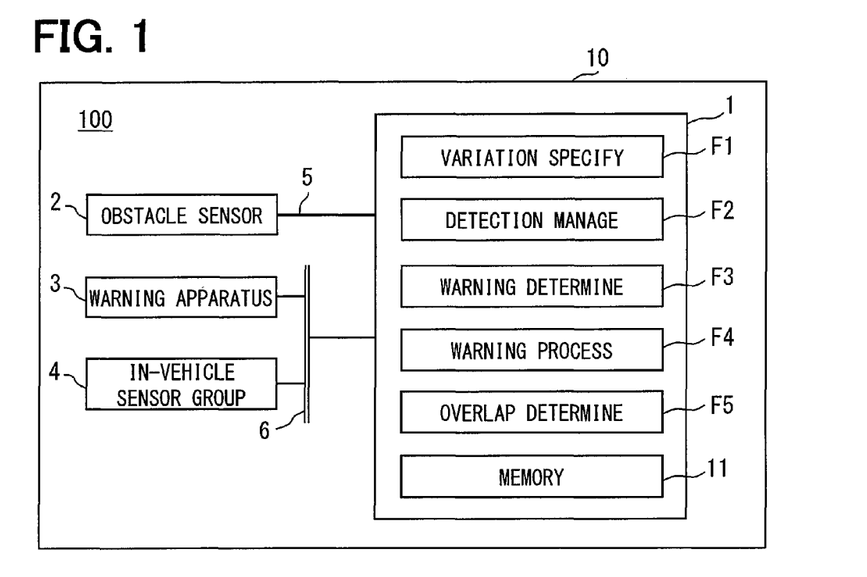
FIG. 1 is a block diagram illustrating a brief configuration of a periphery monitoring system according to an embodiment.

The following will explain an embodiment of the present disclosure with reference to drawings. FIG. 1 is a diagram illustrating an example of a brief configuration of a periphery monitoring system 100 according to the present disclosure. The periphery monitoring system 100, which is mounted in a vehicle 10, includes a periphery monitoring ECU 1, an obstacle sensor 2, a warning apparatus 3, and an in-vehicle sensor group 4, as in FIG. 1. Note that the vehicle 10 mounted with the above may be also referred to as a host vehicle.

The periphery monitoring ECU 1 and the obstacle sensor 2 communicate with each other via a LIN bus 5. In addition, the periphery monitoring ECU 1 communicates with the warning apparatus 3 or the in-vehicle sensor group 4 via an in-vehicle LAN 6.

The obstacle sensor 2 is mounted in the vehicle 10, and detects an object (i.e., an obstacle) which exists in a peripheral region around the vehicle 10. The obstacle sensor 2 may include a milliwave radar, a laser radar, a sonar, or a camera. In addition, the obstacle sensor 2 may be configured by combining some of the foregoing. The obstacle sensor 2 may have a detection range, which covers all the perimeter of the vehicle or have a dead angle in some orientation.

In the present embodiment, the obstacle sensor 2 includes front corner sonars arranged, respectively, at a left side face and a right side face of a front bumper of the vehicle 10, and rear corner sonars arranged, respectively, at a left side face and a right side face of a rear bumper of the vehicle 10. The corner sensors each are a well-known sonar, which transmits search waves and receives reflected waves reflected by an obstacle existing in a propagation range of the search waves, thereby performing a detection of the obstacle and a detection of a distance with the obstacle. Hereinafter, a range which each corner sonar can detect an obstacle is referred to as a detection range.

For example, the front corner sonars may be installed in a left side face and a right side face of the front bumper to each have a posture such that a center line of directionality is parallel with an axle direction of the vehicle 10. The front corner sonars each transmit search waves towards a lateral region relative to the vehicle 10 and forms a predetermined detection range from the installed position to a front-lateral region relative to the vehicle 10.

Further, the central line in the directionality of the front corner sonar may extend to incline frontward up to about 40 degrees with respect to the axle direction of the vehicle 10. In this case, the front corner sonar transmits search waves diagonally frontward of the vehicle 10.

The rear corner sonars may be installed in a left side face and a right side face of the rear bumper to each have a posture such that a center line of directionality is parallel with the axle direction of the vehicle 10. Transmitting search waves towards a lateral region relative to the vehicle 10 allows formation of a predetermined detection range from the installed position to a rear-lateral region relative to the vehicle 10.

Further, the central line in the directionality of the rear corner sonar may extend to incline rearward up to about 40 degrees with respect to the axle direction of the vehicle 10. In this case, the rear corner sonar transmits search waves diagonally rearward of the vehicle 10.

Each corner sonar in the present embodiment is equipped with two elements that receive reflected waves; two elements provide a difference in the reception time when receiving the reflected waves from an identical search wave, and the difference in the reception time allows the detection of the direction of the detected obstacle as well as the distance to the obstacle. The above method specifies the relative position (distance and direction) of the obstacle with respect to the corner sonar based on the difference in the reception time in each element. Such method may apply the method in the description of Patent literature 2.

Naturally, alternatively, the corner sonar may detect only a distance with the obstacle existing in a detection range. In this case, the periphery monitoring ECU 1 mentioned later only needs to specify the relative position of the obstacle from the time-series data of the detection distance. In addition, the obstacle may be regarded as existing at a position separate by the detection distance in the central direction of the directionality.

The position of the obstacle detected by the obstacle sensor 2 represents the position of one point of the obstacle. Hereinafter, the point detected by the obstacle sensor 2 is referred to as a detection point. The obstacle sensor 2 provides successively detection result data that indicate the relative position (distance and direction) of the detection point with respect to the obstacle sensor 2 itself, to the periphery monitoring ECU 1 (e.g., each 100 milliseconds).

Hereinafter, a detection process is defined as a series of processes from transmitting search waves up to providing the periphery monitoring ECU 1 with the detection result data corresponding to the search waves. The detection process may be executed periodically with predetermined detection periods, e.g., under the state receiving a control signal with which the periphery monitoring ECU 1 issues an instruction requiring the detection process. Further, alternatively, the obstacle sensor 2 may be provided to detect relative positions of multiple detection points by one detection process.

The warning apparatus 3 executes a warning notifying the driver of the vehicle 10 of the existence of an obstacle detected by the obstacle sensor 2, based on the instruction from the periphery monitoring ECU 1. The warning apparatus 3 may be achieved using at least one of well-known display apparatus, speaker, and vibration generation apparatus (hereinafter, vibrator) generating vibration.

For example, when the warning apparatus 3 performs a warning via the visual sense of the driver, a display apparatus may be caused to display an image or text that indicates a possibility that the vehicle 10 is to contact the obstacle detected by the obstacle sensor 2. In addition, when the warning apparatus 3 performs a warning via the auditory sense of the driver, a predetermined alarm sound or a message may be audibly outputted. Furthermore, when the warning apparatus 3 performs a warning via the tactile sense of the driver, the vibrator may be caused to vibrate in a predetermined vibration pattern. The vibrator may be installed in a position such as a driver's seat or steering wheel, which makes contact with the driver.

The in-vehicle sensor group 4 is a group of sensors for detecting various quantities of states indicating a travel state of the vehicle 10. The in-vehicle sensor group 4 includes a speed sensor, an acceleration sensor, a gyro sensor, a steering angle sensor, and a shift position sensor.

The speed sensor detects a travel speed of the vehicle 10; the acceleration sensor detects an acceleration which acts in a forth-and-back direction of the vehicle 10. The gyro sensor detects an angular rate of rotation about the vertical axis of the vehicle 10; the steering angle sensor detects a steering angle based on a turn angle of the steering wheel. The shift position sensor detects a position of the shift lever.

Each sensor in the in-vehicle sensor group 4 detects each quantity of state (referred to as vehicle information) and outputs successively to the periphery monitoring ECU 1 (e.g., each 100 milliseconds). Note that the in-vehicle sensor group 4 need not include all the sensors described above. In addition, a sensor included in the in-vehicle sensor group 4 is not limited to the sensors exemplified above. The in-vehicle sensor group 4 just needs to include a sensor that detects a quantity of state used for the periphery monitoring ECU 1 to calculate the variation in the position of the vehicle 10. The quantity of state used for calculating the variation in the position of the vehicle 10 corresponds to quantities of states such as a vehicle speed, a rotation amount of a wheel (angle of rotation), an acceleration, a steering angle, and an angular rate of rotation detected by a gyro sensor. Note that "information" may be used not only as an uncountable noun but also a countable noun.

The periphery monitoring ECU (Electronic Control Unit) 1 is a well-known circuit including a microcomputer and a memory 11; the microcomputer contains CPU, ROM, RAM, and input/output interfaces. The periphery monitoring ECU 1 functions as a variation specification section F1, a detection management section F2, a warning determination section F3, a warning processing section F4, and an overlap determination section F5, by the CPU executing programs stored in the ROM or the memory 11. All or part of the functions executed by the periphery monitoring ECU 1 may be configured as hardware components such as one or more ICs. In addition, the above sections each may be also referred to as a device or a module. The periphery monitoring ECU 1 functions as an obstacle warning apparatus.

In addition, the periphery monitoring ECU 1 executes various processes other than the processes executed by the functional sections mentioned above. For example, it is determined whether the present vehicle speed inputted from the in-vehicle sensor group 4 is within a predetermined operational vehicle speed range. While the vehicle speed is within the operational vehicle speed range, a control signal is outputted which instructs the obstacle sensor 2 to execute the detection process successively. The operational vehicle speed range is supposed to be 40 km/h or less, for example. The above processes may be executed by a single CPU using a well-known task scheduling algorithm, or executed by several CPUs in parallel.

The memory 11 may use a well-known rewritable storage media. Note that when the memory 11 stores programs executed by the CPU, the memory 11 is provided to include a non-volatile storage area that stores at least the programs for the CPU. The memory 11 stores the vehicle-body shape information or detection point management data mentioned later.

The vehicle-body shape information is the information that indicates a body shape of the vehicle 10 such as a vehicle height, a vehicle width, and a forth-and-back directional length. In addition, the vehicle body information includes positions of respective vehicle parts or an installed position of each wheel or obstacle sensor 2. That is, the vehicle-body shape information contains a distance and a direction from the reference point with respect to a front end, a lateral side end, and a corner of the vehicle 10.

The reference point of the vehicle 10, which may be designated as needed, is designated, for instance in the embodiment, as a position corresponding to a vehicle-width center of a rear wheel axle. The reference point may be alternatively designated as a point that has an identical distance from each of the front end and the rear end of the vehicle 10 on a center line having identical distance from each of both the side faces of the vehicle 10.

The variation specification section F1, which may be also referred to as a variation amount specification section, calculates a variation amount in a vehicle position based on the vehicle information inputted successively from the in-vehicle sensor group 4; the vehicle position is each position of the vehicle 10 from a certain time to the present time. The variation in the vehicle position of the vehicle 10 contains a movement distance, a movement direction, and an angle (varied angle) of a variation in the orientation of the vehicle body. How to specify the variation in the vehicle information based on the vehicle information may use a well-known technique.

For example, the variation specification section F1 calculates a movement distance, a movement direction, and a varied angle in a fixed time (e.g., an acquisition interval of vehicle information), based on the rotation angle speed and the vehicle speed contained in the vehicle information each time acquiring the vehicle information. The vehicle position may correspond to the position of the reference point in the vehicle 10. The variation in the vehicle position calculated successively by the variation specification section F1 is used by the next detection management section F2.

The detection management section F2 may be also referred to as a detection result management section; the detection management section F2 manages, as detection point management data, at least one detection point detected by the obstacle sensor 2. The detection point management data is data that indicates a relative position of a detection point relative to the present vehicle position in an XY coordinate system with the vehicle position regarded as an origin. The XY coordinate system has an X axis and a Y axis on a horizontal plane parallel with a road surface. The detection point management data is stored in the memory 11, and successively updated with the variation in the vehicle position and the addition of a detection point.

The detection management section F2 operates specifically as follows. First, the detection management section F2 specifies a relative position of a detection point, which is detected by the obstacle sensor 2, relative to the vehicle 10 when acquiring the detection result data from the obstacle sensor 2. That is, the position of the detection point in the XY coordinate system with the vehicle position regarded as an origin is specified from the installed position and mounting posture of the obstacle sensor 2 in the vehicle 10 and the relative position of the detection point relative to the obstacle sensor 2 indicated in the detection result data. Such specified information on the detection point is added to the detection point management data. The detection point management data is assumed to arrange the information on each detection point in an order of acquiring (i.e., a time-series order).

In addition, the detection management section F2 updates successively the position of the detection point in the above-mentioned XY coordinate system to follow the variation in the vehicle position. In detail, the variation in the vehicle position calculated by the variation specification section F1 is acquired successively; the variation in a position according to the variation in the vehicle position is applied to the position of the detection point, thereby, updating the position of the detection point in the XY coordinate system. Updating the position of the detection point in the XY coordinate system depending on the variation in the vehicle position may use a well-known method. This enables the relative position of each detection point relative to the vehicle position to be specified successively even when the detection point departs from the detection range of the obstacle sensor 2.

In addition, when several detection points are regarded as detection results corresponding to the same obstacle (e.g., a vehicle), the detection management section F2 associates them with each other and manages them as one group. For example, when a detection point acquired at a certain time and a detection point acquired at a subsequent time are present within a fixed distance (e.g., 20 cm), such detection points may be regarded as an identical obstacle. In addition, when a sequence of points arranging several detection points in a time-series order contain detection points belonging to a part that can be approximated with a function, such as an ellipse or parabola, those detection points belonging to such a part may be regarded as corresponding to an identical obstacle.

When an outline shape of the detected obstacle can be specified from the sequence of points of the detection points that are grouped as the above, the detection management section F2 defines the range forming the outline shape as a range where a single obstacle is existing. In addition, a range farther than the specified outline shape in a view from the vehicle 10 may be regarded as a range where the obstacle exists.

The outline shape of the obstacle may be represented with a linear approximation curve calculated as a parent population having the several detection points corresponding to the identical obstacle. In addition, the outline shape of the obstacle may connect several detection points corresponding to the identical obstacle in a time-series order. The detection management section F2 may be also referred to as an obstacle position specification section.

The warning determination section F3, which may be also referred to as a warning necessity determination section, determines whether a warning needs to be executed. Determining whether a warning needs to be executed may be designed as needed. For example, the warning determination section F3 may determine that a warning needs to be executed when the detection point exists within a predetermined distance from the vehicle 10. The distance between the detection point and the vehicle 10 may be a shortest distance between (i) the relative position of the detection point with respect to the vehicle position and (ii) a vehicle range; the vehicle range (i.e., host vehicle range) may be calculated as an existing range of the vehicle 10 with the vehicle position being as a reference, based on the vehicle-body shape information.

In addition, the warning determination section F3 may determine that a warning needs to be executed when the detection point exists in a trapping range caused by a turning radius difference between tracks followed by front and rear inner wheels when turning. In more detail, the warning determination section F3 estimates a route the vehicle 10 will run from the present steering angle and specifies the trapping range caused by the turning radius difference between tracks followed by front and rear inner wheels when turning. When the detection point exists in the trapping range, a warning is determined to need to be executed. Such concept is illustrated in FIG. 2.

Figure 2:
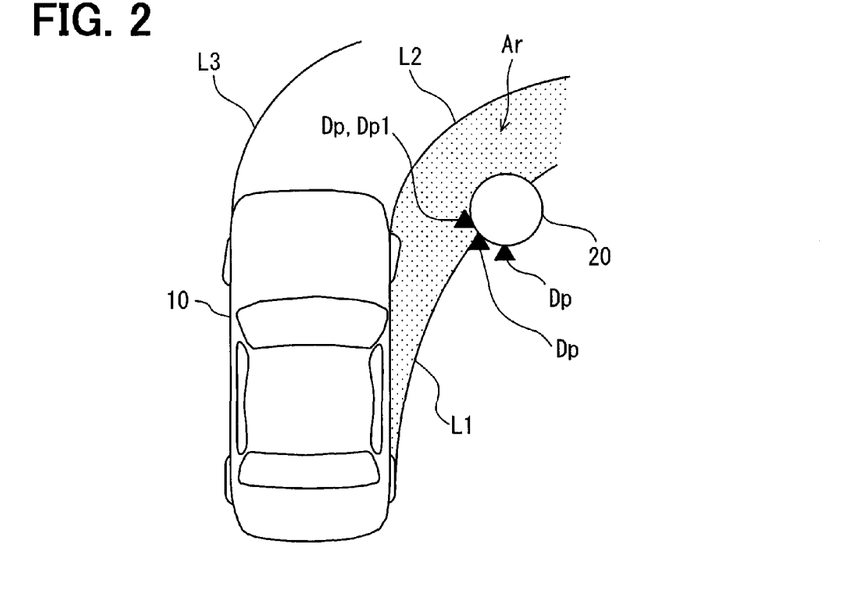
FIG. 2 is a diagram for explaining an operation of a warning determination section.

FIG. 2 illustrates a state where an obstacle 20 is detected with a right-front corner sonar in the vehicle 10 while a steering angle is given in the direction of turning to the right. Note that the vehicle 10 is assumed to run with a vehicle speed within a range of operational vehicle speed.

In FIG. 2, on condition that the vehicle 10 runs with the present steering angle maintained, the curve L1 illustrates a travel locus of the right-rear wheel, the curve L2 illustrates a travel locus of the right-front wheel, and the curve L3 illustrates a travel locus of the left-front wheel. The range Ar sandwiched between the curve L1 and the curve L2 illustrates a trapping range caused by the turning radius difference between tracks followed by front and rear inner wheels when turning. The shapes of the curves L1-L3 or the trapping range may be predetermined with respect to each steering angle; such data may be stored in the memory 11.

In addition, the black triangle mark pointed with each sign Dp illustrates a detection point against an obstacle 20. The detection point Dp1 illustrates a detection point that exists in the trapping range Ar, among the detection points Dp. In the state in FIG. 2, the detection point Dp (Dp1) exists in the trapping range Ar. In such cases, the warning determination section F3 determines that a warning needs to be executed.

In addition to the relative position of the detection point Dp, another parameter such as a vehicle speed of the vehicle 10 may be considered by the warning determination section F3 when a warning needs to be executed. For example, a residual time (referred to as a contact marginal time) up to the time when the vehicle 10 contacts the detection point Dp may be calculated from the vehicle speed and the relative position of the detection point Dp; when the contact marginal time is a predetermined threshold value or less, a warning is determined to need to be executed. Each above condition on which the warning determination section F3 determines that a warning needs to be executed is referred to as a warning condition.

The warning processing section F4 causes the warning apparatus 3 to execute a warning when the warning determination section F3 determines that the warning needs to be executed.

The overlap determination section F5 determines whether the detection point Dp and the vehicle 10 overlap with each other. Whether the detection point Dp overlaps with the vehicle 10 may be determined based on (i) the position of the detection point Dp serving as a determination target and (ii) the vehicle range calculated based on the vehicle-body shape information. For example, when the position of the detection point Dp as a determination target is within the vehicle range (including a boundary line), the detection point Dp may be determined to overlap with the vehicle 10.

Note that the detection point Dp points one point on a boundary line of a range where the obstacle detected by the obstacle sensor 2 exists. Determining whether the detection point Dp overlaps with the range where the vehicle 10 exists is equivalent to determining whether the range where the vehicle 10 exists overlaps with the range where the obstacle exists.

Figure 3:
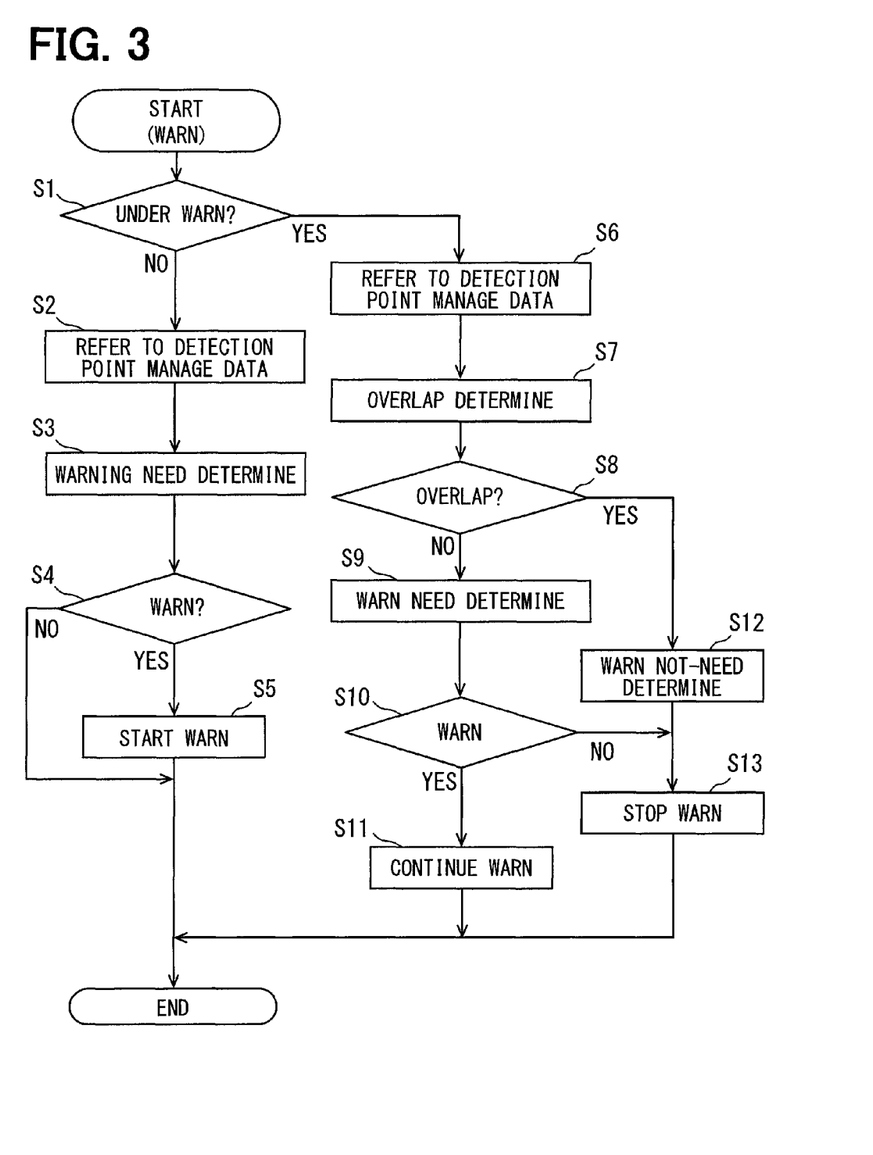
FIG. 3 is a flowchart for explaining a warning related process.

The following describes a warning related process using a flowchart in FIG. 3. The warning related process is a series of processes for determining whether the warning apparatus 3 is caused to execute a warning. The warning related process in FIG. 3 may be executed successively (e.g., each 100 milliseconds) while the ignition switch is under ON state and the vehicle speed is within a range of operational vehicle speed.

It is further noted that a flowchart or processing of the process in the present disclosure includes sections (also referred to as steps), which are represented, for instance, as S1. Further, each section can be divided into several sections while several sections can be combined into a single section. Furthermore, each section can be referred to as a device or module. Further, each section or combined sections can be achieved not only (i) as a software section in combination with a hardware unit (e.g., computer), but also (ii) as a hardware section (e.g., integrated circuit, hard-wired logic circuit), including or not including a function of a related apparatus. Further, the hardware section may be inside of a microcomputer.

First, in S1, it is determined whether the warning processing section F4 causes the warning apparatus 3 currently to execute a warning. When not causing the warning apparatus 3 to execute any warning currently (S1: NO), the processing moves to S2. By contrast, when causing the warning apparatus 3 to execute a warning currently (S1: YES), the processing moves to S6.

Note that the case where the warning processing section F4 causes the warning apparatus 3 to execute a warning is a case where the warning determination section F3 determines that a warning needs to be executed. Therefore, whether the warning determination section F3 has determined that a warning needs to be executed may be alternatively performed in S1.

In S2, the warning determination section F3 refers to the detection point management data; then, the processing moves to S3. That is, in S2, the information is read out; the information is about the position relation between the vehicle 10 at present and the detected obstacle (precisely, a group of the detection points Dp.

In S3, the warning determination section F3 determines whether a warning needs to be executed, based on the detection point management data read in S2. When a warning is determined to need to be executed (S4: YES), the processing moves to S5. Hereinafter, the detection point Dp which serves as the basis of the determination result that the warning needs to be executed is referred to as a warning target detection point Dp.

By contrast, when a warning is not determined to need to be executed (S4: NO), the present process ends. In this case, the status where any warning is not executed is maintained. In S5, the warning processing section F4 causes the warning apparatus 3 to execute a warning; then, the present process ends.

In S6, similar to S2, the warning determination section F3 refers to the detection point management data; then, the processing moves to S7. In S7, the overlap determination section F5 determines whether the warning target detection point Dp and the vehicle 10 overlap with each other. In addition, when the warning target detection point Dp is associated with a detection point(s) Dp (associated detection point), it is also determined whether the associated detection point(s) Dp and the vehicle 10 overlap with each other.

In S7, when at least one of the warning target detection point Dp and the associated detection point(s) Dp overlaps with the vehicle 10 (S8: YES), the processing moves to S12. By contrast, when any one of the warning target detection point Dp and the associated detection point(s) Dp does not overlap with the vehicle 10 (S8: NO), the processing moves to S9.

In S9, similar to S3, the warning determination section F3 determines whether a warning needs to be executed. In this case, the warning is already performed; S9 is equivalent to the process that determines whether the warning needs to be executed continuously. When a warning is determined to need to be executed continuously in S9 (S10: YES), the processing moves to S11. By contrast, when a warning is not determined to need to be executed continuously in S9 (S10: NO), the processing moves to S13.

In S11, the warning processing section F4 continues the state where the warning is executed; the present process ends. In S12, the warning determination section F3 determines that a warning does not need to be executed; then, the processing moves to S13. In S13, the warning processing section F4 stops the warning; then, the present process ends.

(Effects of Present Embodiment)

The above configuration is provided as follows. First, the warning determination section F3 determines that a warning needs to be executed based on a certain detection point Dp. However, when the overlap determination section determines that the vehicle 10 overlaps with at least one of the certain detection point Dp and the associated detection point(s) Dp, the warning determination section F3 determines that the warning does not need to be executed. That is, the determination result of the overlap determination section F5 provides an effect of canceling the warning.

The reason for canceling the warning based on the determination result of the overlap determination section F5 is as follows. First, when a detection point Dp is a detection result of a stationary object actually existing, the vehicle 10 cannot overlap with the detection point Dp. However, the obstacle sensor 2 may provide an incorrect detection of an obstacle, which does not actually exist, due to noises or reflection from road surfaces.

Any obstacle does not exist actually at the position indicated by the detection point Dp obtained from such an incorrect detection; thus, the vehicle 10 can overlap with the detection point Dp. In other words, that the vehicle 10 and the detection point Dp can overlap with each other suggests that any obstacle does not exist in the position indicated by the detection point Dp.

In contrast, when an obstacle is a moving object, the obstacle moves with the lapse of time from the time when the detection point Dp is obtained. The obstacle may fail to exist in the position indicated by the detection point Dp stored in the memory as the detection point management data. One example is illustrated in FIG. 4.

Figure 4:
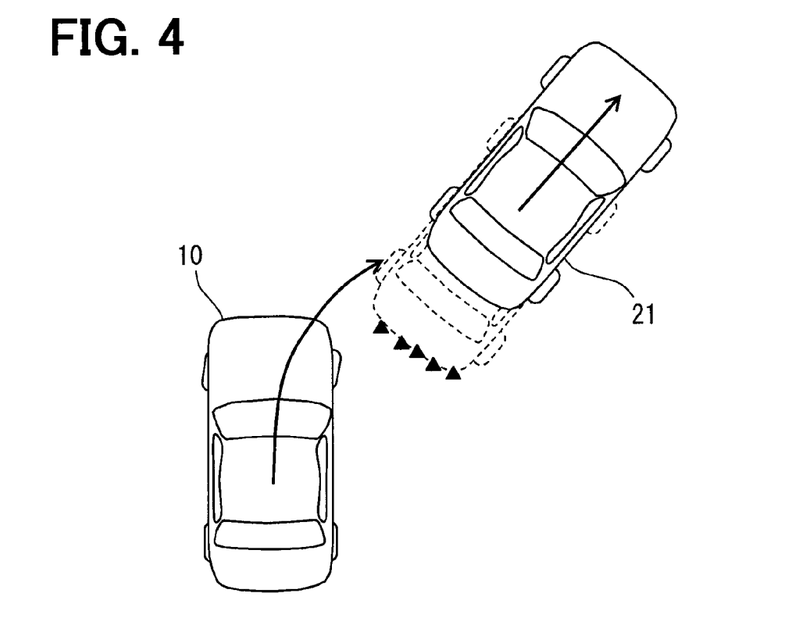
FIG. 4 is a schematic diagram illustrating a position relation with detection points of a different vehicle.

FIG. 4 illustrates a positional relation among the vehicle 10, the detection point(s) Dp, and a different vehicle 21 that is different from the vehicle 10 on the assumption that the detection point Dp for the different vehicle 21 is acquired by the right-front corner sonar of the vehicle 10 and stored in the detection point management data. The broken line near the different vehicle 21 in FIG. 4 illustrates the position of the different vehicle 21 at the time when the detection point Dp was acquired.

Figure 5:
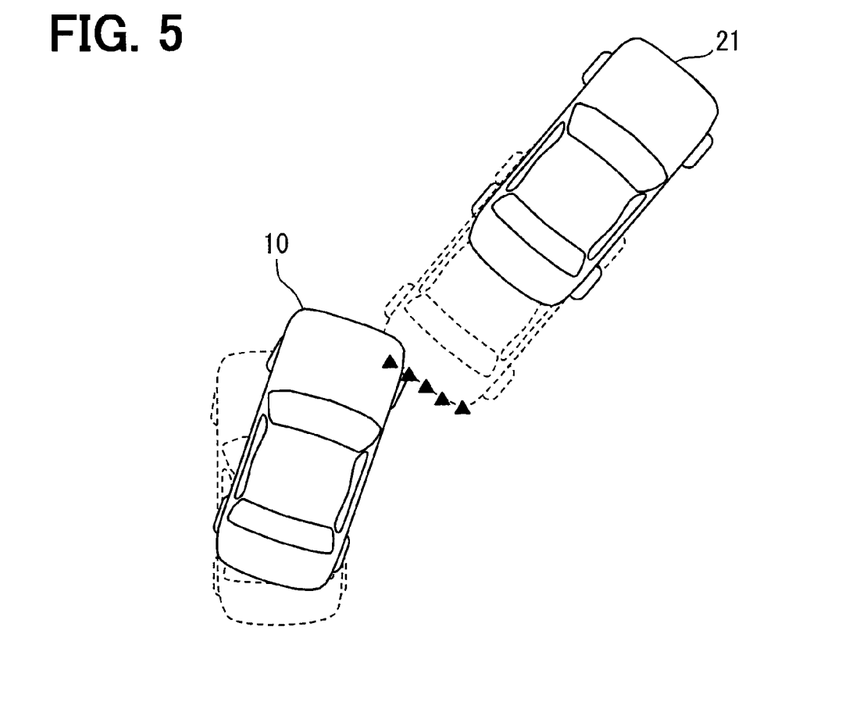
FIG. 5 is a schematic diagram illustrating a state where a vehicle overlaps with a detection point of a different vehicle.

As in FIG. 4, when the different vehicle 21 moves from the position when the detection point Dp is acquired, the different vehicle 21 does not exist in the position indicated by the detection point Dp stored in the memory 11. Therefore, also in such a case, the vehicle 10 can lap with the detection point Dp, as illustrated in FIG. 5. In other words, that the vehicle 10 and the detection point Dp can overlap with each other suggests that any obstacle does not exist in the position indicated by the detection point Dp.

Incidentally, the warning determination section F3 determines the necessity of the warning based on the position of the detection point Dp stored in the memory 11. Therefore, even though any obstacle does not exist in the position indicated by the detection point Dp stored in the memory 11, the necessity of the warning about the detection point Dp is determined when the detection point Dp satisfies a predetermined warning condition. Such warning for an obstacle that does not exist actually is unnecessary. Furthermore, the warning is continued while the warning target detection point Dp or its associated detection point Dp satisfies the predetermined warning condition.

That is, suppose a case where the overlap determination section F3 determines that the vehicle 10 overlaps with the detection point Dp under the state where the warning determination section F3 determines that the warning needs to be executed based on a certain detection point Dp. Such a case signifies unnecessary warning being executed.

Therefore, when the overlap determination section F3 determines that the vehicle 10 overlaps with the detection point Dp under the state where the warning determination section F3 determines that the warning needs to be executed based on a certain detection point Dp, the warning is canceled. This can reduce a period of time during which the unnecessary warning is continued.

In addition, the detection point Dp that is determined to overlap with the vehicle 10 may be associated with other detection point(s) Dp. In such cases, the warning determination section F3 determines that the warning based on the associated detection point Dp is also unnecessary. This is because (i) a detection point Dp determined to overlap with the vehicle 10 and (i) an associated detection point(s) Dp associated with the detection point Dp each correspond to the detection result with respect to an identical moving object.

That is, when one of several associated detection points Dp overlaps with the vehicle 10, the obstacle corresponding to the associated detection points Dp is assumed to have already moved from the position. Therefore, when one of the several associated detection points Dp overlaps with the vehicle 10, there is a high possibility that the obstacle does not exist in the position indicated by the detection point Dp with which the detection point Dp is associated. Thus, the configuration of the present embodiment can reduce the execution of the unnecessary warning more significantly.

The embodiment of the present disclosure is described in the above; however, the present disclosure is not limited to the above embodiment. The following embodiment is also included in the technical scope of the present disclosure; furthermore, another embodiment or modification other than the following is also included in the technical scope of the present disclosure as long as not deviating from the technical subject matter.

<First Modification>

In addition, as a more desirable example, the overlap determination section F5 in a first modification determines whether the detection point Dp and the vehicle 10 overlap with each other in consideration of a detection error of the detection point Dp. The operation of the overlap determination section F5 in the first modification is explained using FIG. 6.

Figure 6:
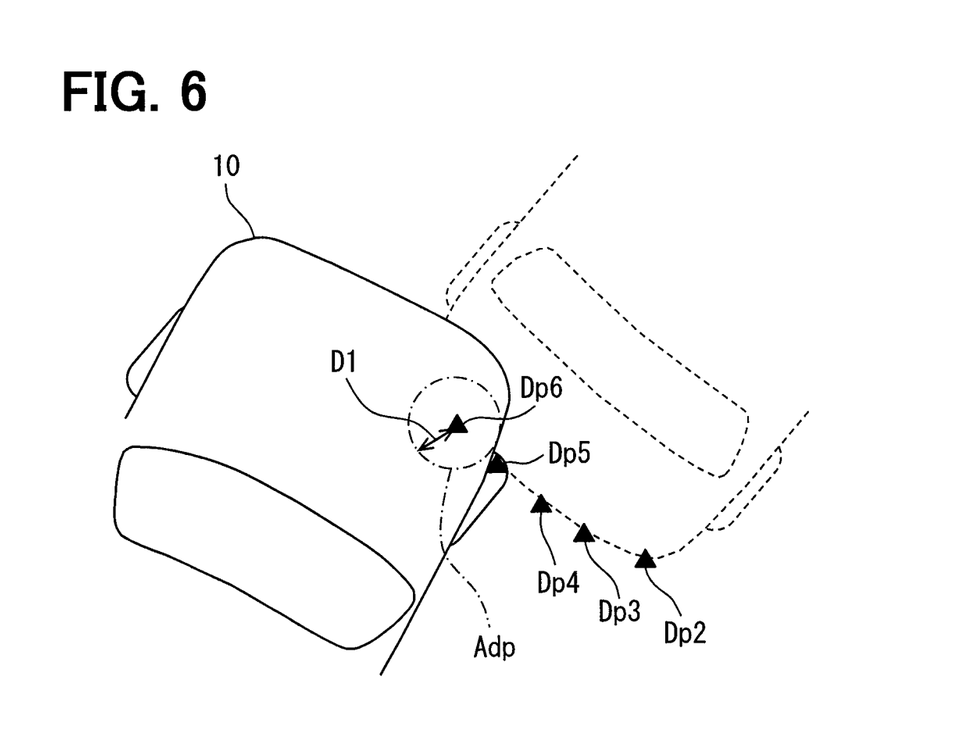
FIG. 6 is a diagram for explaining an operation of an overlap determination section.

In FIG. 6, the detection points Dp 2-6 are associated with each other. For convenience, the detection point Dp6 is assumed to correspond to a warning target detection point, while the detection points Dp 2-5 are assumed to correspond to the associated detection points. The following explains the determination whether the detection point D6 representing the detection points Dp 2-6 overlaps with the vehicle 10.

First, the overlap determination section F5 calculates a detection error area Adp relative to detection point Dp6. The detection error area Adp indicates an area where an obstacle corresponding to the detection point Dp6 may actually exist. This is because the position indicated by the detection point Dp6 is assumed to be deviated, from the actual position, due to an error in calculating a detection accuracy of the obstacle sensor 2 or a variation in the vehicle position. That is, the detection error area Adp indicates a deviation degree of the actual position relative to the position indicated by the detection point Dp6.

For example, the detection error area Adp may be designated as being a range within a predetermined error evaluation distance D1 from the detection point Dp6. The error evaluation distance D1 may be a predetermined constant value, or a variable depending on the detection distance when the detection point Dp6 is acquired. The position of the detection point Dp6 detected by the obstacle sensor 2 tends to include a greater error as the distance (i.e., detection distance) from the installed position to the obstacle is longer.

Therefore, it is desirable that the error evaluation distance D1 is greater as the detection distance when the detection point Dp6 is acquired is longer. In the present embodiment, the memory 11 stores the data indicating the correspondence relation between the detection distance and the error evaluation distance D1. The error evaluation distance D1, which is depending on the detection distance when the detection point Dp6 is acquired, is used by referring to the data.

The overlap determination section F5 determines that the vehicle 10 overlaps with the detection point Dp6 when the whole of the detection error area Adp of the detection point Dp6 overlaps with the vehicle range (as in FIG. 6).

The above configuration can reduce a possibility of cancelling the warning basically necessary by executing an erroneous determination that the vehicle 10 overlaps with the detection point Dp. In more detail, suppose states when the vehicle 10 is closer to the position indicated by the detection point Dp than to the position where the obstacle actually exists. In such states, the vehicle 10 can travel up to the position indicated by the detection point Dp, whereas the vehicle 10 cannot travel up to the position where the obstacle actually exists.

Under the above states, in cases that the vehicle 10 is determined to overlap with the detection point Dp when the position of the detection point Dp is within the vehicle range, the warning is determined to be unnecessary and stopped although the obstacle actually exists immediately close to the vehicle 10.

Thus, the first modification is provided to determine that the detection point Dp overlaps with the vehicle 10 when the vehicle range includes the whole of the detection error area Adp defined with the detection point Dp being centered, instead of including the detection point Dp alone. Such a configuration does not still determine that the detection point Dp overlaps with the vehicle 10 at the stage when the position of the detection point Dp comes to be within the vehicle range.

The configuration of the first modification can reduce a possibility of cancelling a primarily necessary warning.

<Second Modification>

The above first modification uses a detection error range Adp for the detection point DP as an example of determining whether the detection point Dp and the vehicle 10 overlap with each other in consideration of a detection error of the detection point Dp. There is no need to be limited thereto.

The overlap determination section F5 may determine that the vehicle range overlaps with a range where an obstacle exists when the position of the detection point Dp stored in the memory 11 is within an error evaluation distance D1 from the boundary lines (outline) of the vehicle range.

<Third Modification>

Furthermore, the detection management section F2 may specify the outline shape of an obstacle and a range where the obstacle exists. In such cases, the overlap determination section F5 may determine the above determination based on the size of the portion where the vehicle range overlaps with the range where the obstacle exists. For instance, the vehicle width direction length (or vehicle forth-and-back direction length) of the portion where the vehicle range overlaps with the range where the obstacle exist becomes equal to or greater than an error evaluation distance D1. In such cases, the overlap determination section F5 may determine that the vehicle range overlaps with the range where the obstacle exists.

<Fourth Modification>

In the above, the obstacle sensor 2 is provided as an example of forming the detection range in a lateral region relative to the vehicle 10. There is no need to be limited thereto. The obstacle sensor 2 may detect an obstacle which exists in a region in front of or behind the vehicle 10.

Although the present disclosure is described based on the embodiment, it is understood that the present disclosure does not need to be limited to the embodiment or its configuration. The present disclosure also includes various modification examples and modifications within a scope of an equivalent.

In addition, various combinations or embodiments, and other combinations or embodiments which contain only a single element, more than one element, or less than it may be included within a scope or concept of the present disclosure.

The invention claimed is:

1. An obstacle warning apparatus used in a vehicle, cooperating with an obstacle sensor that detects an obstacle around the vehicle, the obstacle warning apparatus comprising:
    an obstacle position specification section that specifies a position of an obstacle with respect to the vehicle based on a detection result by the obstacle sensor;
    a warning determination section that determines whether a warning that reports an existence of the obstacle needs to be executed, based on the position of the obstacle specified by the obstacle position specification section;
    a warning processing section that causes the warning to be executed to a driver when the warning determination section determines that the warning needs to be executed;
    an overlap determination section that determines whether a vehicle range where the vehicle exists overlaps with a range where the obstacle exists, based on the position of the obstacle specified by the obstacle position specification section; and
    a variation specification section that specifies a variation amount of the position of the vehicle,
    wherein:
    the position of the obstacle specified by the obstacle position specification section indicates a position of a detection point that is one point included in the obstacle;
    the obstacle position specification section stores in a memory the position of the detection point with respect to the vehicle specified based on the detection result by the obstacle sensor, while updating the position of the detection point stored in the memory depending on the variation amount of the position of the vehicle to successively specify a relative position of the obstacle with respect to the vehicle;
    the overlap determination section determines that the vehicle range overlaps with the range where the obstacle exists, when the position of the detection point stored in the memory exists within the vehicle range, the position of the detection point being updated in the memory depending on the variation amount of the position of the vehicle; and
    the warning determination section determines that the warning about the obstacle does not need to be executed when the overlap determination section determines that the vehicle range overlaps with the range where the obstacle exists.

2. The obstacle warning apparatus according to claim 1, wherein:
    the overlap determination section estimates an error between the position of the obstacle specified by the obstacle position specification section and a position where the obstacle actually exists; and
    the overlap determination section determines that the vehicle range overlaps with the range where the obstacle exists when a vehicle-width direction or a vehicle-back-and-forth direction of an overlap portion is equal to or greater than the error, the overlap portion in which the vehicle range overlaps with the range where the obstacle exists, the range where the obstacle exists.

3. The obstacle warning apparatus according to claim 1, wherein:
    the overlap determination section calculates a detection error range that is a range where the obstacle can exist actually against, as a basis, the position of the obstacle specified by the obstacle position specification section; and
    when the vehicle range overlaps with a whole of the detection error range, the overlap determination section determines that the vehicle range overlaps with the range where the obstacle exists.

4. The obstacle warning apparatus according to claim 1, wherein
    when the position of the detection point specified by the obstacle position specification section is located within the vehicle range and separated from an outline of the vehicle range by a predetermined distance or greater, the overlap determination section determines that the vehicle range overlaps with the range where the obstacle exists.

5. The obstacle warning apparatus according to claim 1, wherein:
- the obstacle position specification section determines whether the a plurality of detection points stored in the memory are detection results that are each with respect to an identical obstacle;
- when determining that the plurality of detection points stored in the memory are detection results that are each with respect to the identical obstacle, the obstacle position specification section stores the detection points to be associated with each other;
- when a position of a detection point, which is stored in the memory and relative to the vehicle, satisfies a warning condition to determine that the warning needs to be executed, the warning determination section determines that the warning about the detection point needs to be executed; and
- when the overlap determination section determines that the vehicle range overlaps with the range where the obstacle exists, based on at least one of the plurality of detection points associated with each other, the warning determination section determines the warning does not need to be executed with respect to all of the detection points associated with each other.

6. The obstacle warning apparatus according to claim 1, wherein:
- the obstacle sensor detects the obstacle which exists in a lateral region relative to the vehicle; and
- the obstacle position specification section specifies the position of the obstacle that exists in the lateral region based on the detection result by the obstacle sensor.

* * * * *